United States Patent Office 2,900,229
Patented Aug. 18, 1959

2,900,229

URANIUM LEACHING AND RECOVERY PROCESS

Leslie A. McClaine, Palo Alto, Calif., assignor to the United States of America as represented by the United States Atomic Energy Commission No Drawing. Application August 10, 1956
Serial No. 603,466

10 Claims. (Cl. 23—14.5)

The present invention relates generally to the recovery of uranium from ore and, more particularly, to a carbonate leaching process wherein a novel method of precipitation is employed for the recovery of the uranium from the leach solution.

Leaching of various ores with carbonate solutions has been employed for many years as the initial operation for recovering uranium from ores such as carnotite, etc. Such solutions contain the uranium as very stable uranyl carbonate complexes together with many impurities. Recovery of the uranium from such solutions is difficult to effect economically and many recovery methods destroy the effectiveness of the solution for recycling purposes.

The present invention is predicated on the discovery that uranium can be recovered from such carbonate leach solutions by precipitation as a hydrated oxide of mixed valence state at elevated pH values. Such precipitation is effected simply by introducing tetravalent uranium into the solution to react with the hexavalent uranyl carbonate complexes and subsequently elevating the pH of the solution to above a value of about 13 whereby the uranium is precipitated as a dark, readily filtered hydrated oxide of mixed valence state. Modifications of the process provide for recycling of the leach solution, elimination and/or recovery of vanadium and other advantageous methods of practical operation.

Accordingly, it is an object of the present invention to provide a carbonate leaching process for the recovery of uranium from ores.

Another object of the invention is to provide a carbonate leaching process wherein the uranium is precipitated as a hydrated oxide of mixed valence state at an elevated pH.

Still another object of the invention is to provide a process wherein uranium is selectively precipitated from a carbonate leach solution by adding tetravalent uranium thereto and elevating the pH to a value of above about 13.

Yet another object of the invention is to provide a process for separating and recovering uranium and vanadium values comprising the step of treating said values with an aqueous alkali metal carbonate solution to produce at least a solution containing hexavalent uranium carbonate complex and pentavalent vanadium ions adding a solution of tetravalent uranium carbonate complexes to the leach solution and adding a base to said solution to elevate the pH thereof to a value of above about 13, thereby precipitating the uranium values as a hydrous oxide of mixed valence state, separating the uranium precipitate from the solution, then electrolyzing the vanadium containing residual solution at a mercury cathode to reduce and precipitate the vanadium, thereafter separating the vanadium values from said electrolyzed solution, and then reconditioning and recycling the uranium and vanadium depleted leach solution.

A further object of the invention is to provide a carbonate leaching process for the recovery of uranium from ores wherein the uranium is precipitated as a hydrated oxide of mixed valence state and the leach solution is economically restored for recycling.

Other objects and advantages of the invention will be apparent by consideration of the following description.

The initial solution may be either a carbonate leach solution obtained by various conventional methods or one that is obtained by the use of recycled leach solution as indicated hereinafter. In leaching operations as typically practiced the uranium ore, such as carnotite, may be roasted in air at elevated temperatures, e.g., about 500° C., to facilitate subsequent leaching operations. In other instances the ore may be admixed with 5–10% of salt and roasted at higher temperatures, e.g., about 800° C. to improve vanadium recovery. The hot ore in either case is quenched by submersion in heated aqueous solutions of about 5–10% $Na_2CO_3$ concentration, whereby the uranium is dissolved with some impurities by forming soluble uranyl carbonate complexes therein. The carbonate solution contains an equilibrium mixture of carbonate and bicarbonate and usually has a pH value below about 12. The uranium content is usually of the order of 0.2–0.4% by weight but may range below and above this range. Impurities may include sulfate, chloride, phosphate and aluminum and vanadium may be present. If vanadium is present in excessive amounts a preferred method of operation is employed to avoid undue interference with the uranium leaching during recycle operations as described more fully hereinafter. Various other ores and similar treatments may be employed likewise. In any event there is first produced from the source material a carbonate solution containing at least the uranium values.

To recover the uranium from the carbonate leach solution a quantity of tetravalent uranium compound is introduced into the solution and later the alkalinity of the solution is increased to a value above about pH 13, whereupon the aforesaid hydrated oxides of mixed valence state precipitate. Such precipitate is then filtered or otherwise separated from the solution and dried, calcined or otherwise processed by conventional procedures into chemical compounds. In the presence of vanadium, the uranium is selectively reduced by the addition of the tetravalent complex solution and is selectively precipitated away from the vanadium in the solution.

The tetravalent uranium compound is most conveniently introduced as a solution. While various soluble tetravalent salts such as the nitrate might be employed, the acidity of such solutions is disadvantageous. It is preferable to introduce the tetravalent uranium as a relatively concentrated aqueous solution of tetravalent uranium carbonate complex. Such a carbonate complex solution can be prepared by dissolving various tetravalent compounds of uranium in an alkali metal carbonate solution; however, in practical operations it is generally more economical to prepare the solution by reduction of uranyl carbonate complex solutions with powerful reducing agents. Sodium hydrosulfite, sodium amalgam and electrolysis as well as other reducing agents may be so employed.

In practical plant operations electrolytic reduction of a portion of the carbonate leach solution is economically effected in the cathode compartment of a mercury cathode cell in which the anode and cathode compartments are separated by a porous barrier to prevent re-oxidation of the solution at the anode. The more concentrated the tetravalent uranium carbonate solution the better becomes the precipitation of the uranium. Experimental work indicates that when the tetravalent uranium content (calculated as $U_3O_8$) exceeds 30 g. per liter, insoluble uranous hydroxide precipitates. Accordingly such concentration is about the maximum which can be used. A carbonate leach solution containing uranyl carbonate complexes yielding the indicated concentration of tetravalent uranium can be reduced with as low a power consumption as 0.405 amp.-min./ml. In cyclic plant processes a portion of the precipitate product or other uranium bearing material can be re-oxidized with air, $H_2O_2$, or other oxidizing agent and dissolved in the initial carbonate leach solution or other sodium carbonate solution to yield a solution of this uranium content. Employing about 0.6 mole of the tetravalent uranium to each mole of hexavalent uranium in a typical carbonate leach solution and 0.75 mole of NaOH which elevated the pH of the solution to a value of above 13, uranium was precipitated until the residual uranium content was below about 30 mg. $U_3O_8$ equivalent content. The composition of the precipitate is variable and depends on the relative ratio of uranous to uranyl carbonate complexes present in the respective solutions. With each type of solution an optimum value of mole ratio will be found as determined by precipitation efficiency. Minimum mole ratios of about 0.5 mole tetravalent to hexavalent uranium carbonate complexes in the admixed solutions will be effective and mole ratios of above 0.7–0.8 will generally be excessive and wasteful of the reduced solution.

The chemistry of the uranium carbonate complexes and the precipitation mechanisms involved in the present process is interesting and complicated. The uranyl carbonate complex ion which is considered to be $UO_2(CO_3)_3^{-4}$ is very stable and exists in carbonate solutions in which the $CO_3^=$ concentration is low. Uranium may be precipitated from solutions of this complex as a yellow-orange compound, called diuranate, by adding alkaline solutions thereto; however, when a large excess of $CO_3^=$ is present (e.g., 1 M $CO_3^=$ to 0.01 M of U) large quantities of base must be added to obtain a near quantitative precipitation.

Uranyl carbonate complex leach solutions which contain an excess of the alkali metal carbonate and having some $HCO_3^-$ present to buffer out $OH^-$ can be reduced with powerful reducing agents; e.g., Zn, Al, Mg, $S_2O_4^=$, NaHg and, especially, by hydrolysis at a mercury cathode. As the reduction proceeds the yellow color of the uranyl carbonate complex diminishes and is replaced by the sea green color of the tetravalent uranium carbonate complex which is produced thereby.

As might be expected from the very low solubility of $U(OH)_4$ ($K_{sp}$ $U(OH)_4$ is about $10^{-45}$) the tetravalent complex is susceptible to hydrolysis and requires an excess of $CO_3^=$ in the solution for existence. As a consequence, attempts to produce the tetravalent complex by reduction of ordinary aqueous or bicarbonate solutions of uranyl compounds end in failure as the green, solid hydroxide $U(OH)_4$ precipitates instead. Likewise, the addition of strong or weak bases or the removal of $CO_3^=$ as by adding $H^+$ to the solution of tetravalent carbonate complex will precipitate $U(OH)_4$.

Both the tetravalent complex and $U(OH)_4$ are easily oxidized by air or in solutions containing dissolved oxygen. Under these conditions, $U(OH)_4$ rapidly darkens and eventually becomes black in color; however, if protected from air no color change is noted over long periods of time. Therefore $U(OH)_4$ has no tendency to dehydrate to $UO_2$ and it is believed that the black product formed by the contact of moist $U(OH)_4$ precipitates with air or oxygen is a mixture of $U(OH)_4$ and hydrated $U_3O_8$.

On the addition of base ($OH^-$) to a carbonate solution containing both tetravalent and hexavalent uranium carbonate complexes, initially some green $U(OH)_4$ is noted to precipitate. With the continued addition of $OH^-$, a brownish-black precipitate forms and rapidly settles from the solution. This black precipitate is concluded to be undoubtedly a mixed tetravalent and hexavalent oxidation state hydrous oxide because $NH_4OH$ causes the precipitation of only $U(OH)_4$ under the same conditions due to the well known solubility of the uranyl carbonate complex in $(NH_4)_2CO_3$ solutions. The black precipitate is considered to be due to the presence of hydrated $U_3O_8$ ($U_3O_8 \cdot xH_2O$) formed as indicated by the following equation:

$$U(CO_3)_4^{-4} + 2UO_2(CO_3)_3^{-4} + 8OH^- = U_3O_8 \cdot xH_2O + 10CO_3^= + (4-x)H_2O$$

It will be noted that the formation of this brownish-black precipitate on the addition of $OH^-$ to carbonate solutions containing uranium constitutes a rapid qualitative test for the presence of tetravalent in admixture with hexavalent uranium in such a solution. Calcination of the precipitate yields an anhydrous oxide product.

Ordinary technical grade caustic soda can be employed either as a concentrated solution or added in solid form to effect the increase in pH required for precipitation or the concentrated caustic solution may be produced electrolytically at the plant site in accordance with conventional practice.

Following separation of the uranium precipitate from the solution the residual leach solution is reconditioned for recycling. In the event that the vanadium content of the leach solution is sufficient the concentration will eventually build up on recycling to a level at which interference with the precipitation of the uranium will become appreciable. Accordingly, it is often necessary to decrease the vanadium content of the residual leach solution at periodic intervals; however, it is not necessary to effect complete removal of the vanadium since vanadium concentrations of the order of 25 to 40 grams per liter in the leach solution are usually tolerated.

Removal and recovery of the vanadium from the leach solution remaining from the uranium recovery operation is preferably effected by electrolysis in a mercury cathode cell having anode and cathode compartments which are separated by a porous diaphragm. The leach solution may be passed through the cathode compartment of the cell while applying an electrolyzing current density in the range of about 0.2 to 0.5 amp. per square inch at a flow rate such that the vanadium concentration is decreased to a level of about 1 to 5 gm./liter. Excessive power consumption is required to reduce the vanadium content below this level and such a level is tolerated in the leaching and subsequent uranium precipitation steps even with the usual increases of the vanadium content in the leaching operation. A sodium carbonate solution may be employed or barren leach solution may be recycled in the anode compartment of the vanadium removal cell during the electrolysis.

In connection with the reduction-precipitation of vanadium in such a mercury diaphragm cell it should be noted that the mercury cathode is specific for such purpose; however, the mercury can be disposed as an amalgamated film on copper or nickel. The diaphragms may be of close weave asbestos, nylon or cotton fabrics, or of sintered glass, porous Alundum plate or constitute a cation exchange resin membrane. Greater current efficiencies are obtained by agitating the cathode surface or the catholyte, e.g., with a stirrer and excluding air to prevent re-oxidation of the solutions. To effect most economical operation agitation of the cathode surface gave a relative current efficiency of 130% and agitation of the catholyte 100% as compared to only 37% with no agitation, under comparable conditions and with the current efficiencies calculated on the basis of precipitation as a trivalent hydrous oxide. The efficiency of over 100% indicates that some of the vanadium is precipitated in a higher oxidation state, e.g., as vanadyl vanadate. The improvement with agitation seems to be due to the removal of a film, perhaps vanadic oxide, which otherwise collects on the mercury surface.

Operation at an elevated temperature (about 80° C.) also improves efficiency up to 100%. Moreover, the increase of pH which is employed in the uranium recovery operation uniquely cooperates with the vanadium step and materially decreases the amount of electrolytic current required since vanadium reduction at the higher pH is more efficient. The vanadium precipitate emerges from the electrolytic cell as a slurry in admixture with the catholyte. The vanadium precipitate is filtered from the catholyte obtained in the vanadium removal step washed, dried and calcined to the oxide.

In recycle operations the residual catholyte obtained from the foregoing or the residual leach solution remaining from the uranium recovery operation described hereinbefore is passed as anolyte through the uranium carbonate complex reduction cell. During the electrolysis therein the pH of the barren leach solution is decreased to a level in the range of about 9–11 which has been found most effective for leaching purposes and the reconditioned leach solution is recycled in new leaching operations. Replenishment of the carbonate content and equivalent adjustment of the pH by other means may also be employed.

Further details of the operation of the process of the invention will become apparent by consideration of the following specific examples.

*Example I*

A sodium carbonate solution of tetravalent uranium was prepared electrolytically by reducing a sodium carbonate uranyl carbonate in the cathode compartment of a mercury cathode diaphragm cell. The original solution had a carbonate content of 0.6 M, a bicarbonate content of 0.3 M, and a hexavalent uranium content of 0.07 M. A sodium carbonate solution was used as anolyte. Analysis following reduction in the cathode compartment showed that 98.7% of the uranium was present in the tetravalent oxidation state.

Various aliquots of the tetravalent uranium solution and various amounts of solid sodium hydroxide were added to 25 ml. portions of a typical carbonate leach solution which contained 4.23 grams of hexavalent uranium per liter with the results tabulated below. It will be noted that substantially all of the uranium was precipitated in each instance.

| Test No. | NaOH Added (g.) | Tetravalent Uranium Solution (ml.) | Uranium in Filtrate (g./l. $U_3O_8$) | Uranium Precipitated (percent) |
|---|---|---|---|---|
| 1 | 1.4 | 10 | 0.069 | 97.7 |
| 2 | 1.6 | 15 | 0.042 | 98.5 |
| 3 | 1.8 | 20 | 0.036 | 98.5 |
| 4 | 2.0 | 25 | 0.035 | 98.4 |
| 5 | 2.1 | 10 | 0.055 | 98.2 |
| 6 | 2.8 | 10 | 0.055 | 98.2 |

*Example II*

A solution containing tetravalent uranium carbonate complex was prepared by electrolyzing for 4.5 hours a sodium carbonate solution (0.9 M $CO_3^=$ and 0.2 M $HCO_3^-$) and containing 0.016 mole/liter of hexavalent uranium in the cathode compartment of a mercury cathode diaphragm type cell at a current density of 0.026 amp./cm.$^2$. As the reduction progressed the yellow uranyl color of the solution decreased and was replaced by a light sea green color with no accompanying precipitation. Titration with 0.1 M K $MnO_4$ indicated that the catholyte contained 0.0144 mole/liter of tetravalent U.

Free $CO_3^=$ must be present in the catholyte to provide the tetravalent uranium carbonate complex therein. This fact was discovered when an attempt was made to prepare the tetravalent complex by electrolytic reduction, with a mercury cathode, of a 0.2 M $HCO_3^-$ solution containing 0.05 M hexavalent uranium. Green $U(OH)_4$ began to precipitate immediately upon application of the current and the supernatant catholyte gave a negative test for tetravalent complex. Reduction of the solution with $S_2O_4^=$ yielded similar results.

*Example III*

Sodium amalgam (0.01% Na) intimately contacted with the solution and $S_2O_4^=$ on heating for, e.g., up to one hour were found effective to reduce the hexavalent uranium in a solution which had a content of 0.016 M U, 0.2 M $HCO_3^-$ and 0.9 M $CO_3^=$. Reduction of this solution with Zn, Mg and Al was found to be slow under these conditions. However, reduction proceeded more rapidly when a 1 M sodium carbonate solution, having present sufficient $HCO_3^-$ to buffer out $OH^-$ and containing about 0.1 M $UO_2(CO_3)^{-4}$ was contacted with Zn, Al, Mg, $S_2O_4^=$, NaHg or electrolyzed at a mercury cathode.

What is claimed is:

1. In a process for recovering hexavalent uranium values from a carbonate solution, the steps comprising introducing tetravalent uranium carbonate complex ion into said solution, and then elevating the basicity of said solution to a pH value of above about 13, whereby the uranium precipitates as a hydrous oxide of mixed valence state.

2. In a process for recovering hexavalent uranium values from a carbonate leach solution, the steps comprising adding a carbonate solution containing tetravalent uranium carbonate complexes to said leach solution, and then increasing the basicity of said solution to a value above about pH 13, whereby the uranium is precipitated as a mixed valence state hydrous oxide.

3. In a process for recovering uranium values from a material, the steps comprising producing a carbonate solution of said material containing the uranium as hexavalent uranium carbonate complexes, introducing a carbonate solution of tetravalent uranium carbonate complexes into said solution, and then increasing the basicity of said solution to provide a pH value of above about 13, whereby the uranium values are precipitated as a mixed valence state hydrous oxide.

4. In a process for recovering uranium values from an ore, the steps comprising producing a carbonate solution of said ore containing the uranium as hexavalent uranium carbonate complexes, introducing a carbonate solution of tetravalent uranium carbonate complexes into said solution, and then increasing the basicity of said solution to provide a pH value of above about 13, whereby the uranium values are precipitated as a mixed valence state hydrous oxide.

5. In a process for separating and recovering uranium and vanadium values from a material, the steps comprising producing a carbonate solution of said material containing hexavalent uranium carbonate complexes and pentavalent vanadium ions, introducing tetravalent uranium carbonate complexes into said solution, increasing the basicity of said solution to a pH value of above about 13, whereby the uranium is selectively precipitated as a hydrous oxide of mixed valence state away from vanadium in the solution, separating the precipitate from the solution, and recovering vanadium values from the solution.

6. In a process for separating and recovering uranium and vanadium values from an ore, the steps comprising treating said ore with an aqueous alkali metal carbonate solution to produce a leach solution containing hexavalent uranium carbonate complexes and pentavalent vanadium ions, adding a solution of tetravalent uranium carbonate complexes to the leach solution, adding a base to said solution to elevate the pH thereof to a value above about 13, whereby the uranium precipitates as a hydrous oxide of mixed valence state, separating the precipitate from the solution, then electrolyzing the solution at a mercury cathode to reduce and precipitate the vanadium from the solution, and separating the vanadium from the solution.

7. In a process for separating and recovering uranium and vanadium values from an ore, the steps comprising treating said ore with an aqueous alkali metal carbonate solution to produce a leach solution containing hexavalent uranium carbonate complex and pentavalent vanadium ions, adding a solution of tetravalent uranium carbonate complex ions to the leach solution, adding a base to said solution to elevate the pH thereof to a value of above about 13 to precipitate the uranium as a hydrous oxide of mixed valence state, separating the uranium precipitate from the solution, then electrolyzing the solution at a mercury cathode to reduce and precipitate the vanadium from the solution, separating the precipitate from the solution, and then reconditioning and recycling the leach solution.

8. In a process for separating and recovering uranium and vanadium values from an ore, the steps comprising treating said ore with aqueous alkali metal carbonate to produce a leach solution containing hexavalent uranium carbonate complex and pentavalent vanadium ions, adding a solution of tetravalent uranium carbonate complex ions to the leach solution, adding a base to said solution to elevate the pH thereof to a value of above about 13 to precipitate the uranium as a hydrous oxide of mixed valence state, separating the uranium precipitate from the solution, then electrolyzing the solution in the cathode compartment of a mercury cathode diaphragm cell to reduce and precipitate the vanadium from the solution, separating the precipitate from the solution, and then reconditioning and recycling the leach solution.

9. In a cyclic process for separating and recovering uranium and vanadium values from an ore, the steps comprising treating said ore with an aqueous alkali metal carbonate solution to produce a leach solution containing hexavalent uranium carbonate complex and pentavalent vanadium ions, adding a solution of tetravalent uranium carbonate complex ions to the leach solution, adding a base to said solution to elevate the pH thereof to a value of above about 13 to precipitate the uranium as a hydrous oxide of mixed valence state, separating the uranium precipitate from the solution, oxidizing said precipitate to the hexavalent state and producing therefrom a carbonate solution of hexavalent uranium carbonate complex ions, treating said carbonate solution with powerful reducing agents to reduce and convert the hexavalent uranium carbonate complex ions into tetravalent uranium carbonate complex ions, recycling the reduced solution to precipitate uranium as described hereinbefore, then electrolyzing the solution in the cathode compartment of a mercury cathode diaphragm cell to reduce and precipitate the vanadium from the solution, separating the precipitate from the solution, and then reconditioning and recycling the leach solution.

10. In a cyclic process for separating and recovering uranium and vanadium values from an ore, the steps comprising treating said ore with an aqueous alkali metal carbonate solution to produce a leach solution containing hexavalent uranium carbonate complex and pentavalent vanadium ions, adding a solution of tetravalent uranium carbonate complex ions to the leach solution, adding a base to said solution to elevate the pH thereof to a value of above about 13 to precipitate the uranium as a hydrous oxide of mixed valence state, separating the uranium precipitate from the solution, oxidizing said precipitate to the hexavalent state and producing therefrom a carbonate solution of hexavalent uranium carbonate ions, electrolyzing the solution derived of the precipitate in the cathode compartment of a first mercury cathode diaphragm cell to reduce and convert the hexavalent uranium carbonate complex ions into tetravalent uranium carbonate complex ions, recycling the reduced solution to precipitate uranium as described hereinbefore, then electrolyzing the solution in the cathode compartment of a mercury cathode diaphragm cell to reduce and precipitate the vanadium from the solution, separating the precipitate from the solution, and passing the residual leach solution through the anode compartment of said first electrolytic cell to lower the pH thereof for reconditioning, and recycling the leach solution.

References Cited in the file of this patent

UNITED STATES PATENTS

| | | |
|---|---|---|
| 1,129,029 | Vogt | Feb. 16, 1915 |
| 2,727,806 | Forward et al. | Dec. 20, 1955 |
| 2,743,222 | Clevenger | Apr. 24, 1956 |

OTHER REFERENCES

Harris et al.: Journal of American Chemical Society, 69: 446–451 (1947).

Bachelet et al.: "Bulletin de la Societe Chimique de France," January-February 1952, pp. 55–60.

AEC Document RMO–2519 April 6, 1953, 11 pages (date declassified Sept. 23, 1955).

Proceedings of the International Conference on the Peaceful Uses of Atomic Energy, Aug. 8–20, 1955, vol. 8, pp. 26–27, United Nations (1956).